(12) United States Patent
Kahol et al.

(10) Patent No.: US 11,388,146 B2
(45) Date of Patent: Jul. 12, 2022

(54) SECURE LOW-LATENCY TRAPDOOR PROXY

(71) Applicant: Bitglass, Inc., Campbell, CA (US)

(72) Inventors: Anurag Kahol, Los Gatos, CA (US);
Anoop Kumar Bhattacharjya, Campbell, CA (US); Balas Natarajan Kausik, Los Gatos, CA (US); Siva Saran Kumar Kollipara, San Jose, CA (US)

(73) Assignee: Bitglass, LLC, Austin, TX (US)

( * ) Notice: Subject to any disclaimer, the term of this patent is extended or adjusted under 35 U.S.C. 154(b) by 202 days.

(21) Appl. No.: 16/740,387

(22) Filed: Jan. 10, 2020

(65) Prior Publication Data
US 2021/0218709 A1    Jul. 15, 2021

(51) Int. Cl.
*H04L 29/06*    (2006.01)
*H04L 9/40*    (2022.01)
*H04L 9/32*    (2006.01)

(52) U.S. Cl.
CPC ........ *H04L 63/0281* (2013.01); *H04L 9/3263* (2013.01); *H04L 63/0435* (2013.01); *H04L 63/1416* (2013.01); *H04L 63/1433* (2013.01); *H04L 2209/38* (2013.01)

(58) Field of Classification Search
CPC ............ H04L 2209/38; H04L 63/0281; H04L 63/0435; H04L 63/1416; H04L 63/1433; H04L 9/3263
See application file for complete search history.

(56) References Cited

U.S. PATENT DOCUMENTS

| | | | |
|---|---|---|---|
| 7,900,042 B2 * | 3/2011 | Hall | H04L 63/30 713/160 |
| 10,708,256 B1 * | 7/2020 | Kane-Parry | H04L 63/061 |
| 11,265,303 B2 * | 3/2022 | Chen | H04L 9/0861 |
| 2014/0115702 A1 * | 4/2014 | Li | H04L 63/0464 726/23 |
| 2019/0288985 A1 * | 9/2019 | Chambers | H04L 63/101 |
| 2020/0136836 A1 * | 4/2020 | Schiattarella | H04L 63/0823 |
| 2020/0236093 A1 * | 7/2020 | Bannister | H04L 9/0861 |
| 2020/0287888 A1 * | 9/2020 | Moore | H04L 63/0227 |
| 2021/0119973 A1 * | 4/2021 | Eriksson | H04L 63/0876 |

* cited by examiner

*Primary Examiner* — Joseph P Hirl
*Assistant Examiner* — Ka Shan Choy
(74) *Attorney, Agent, or Firm* — Wong & Rees LLP; Kirk D. Wong

(57) ABSTRACT

A proxy system is installed on a computing device that is in the network path between the device and the Internet. The proxy system, residing on the computing device, decrypts and inspects all traffic going in and out of the computing device.

20 Claims, 8 Drawing Sheets

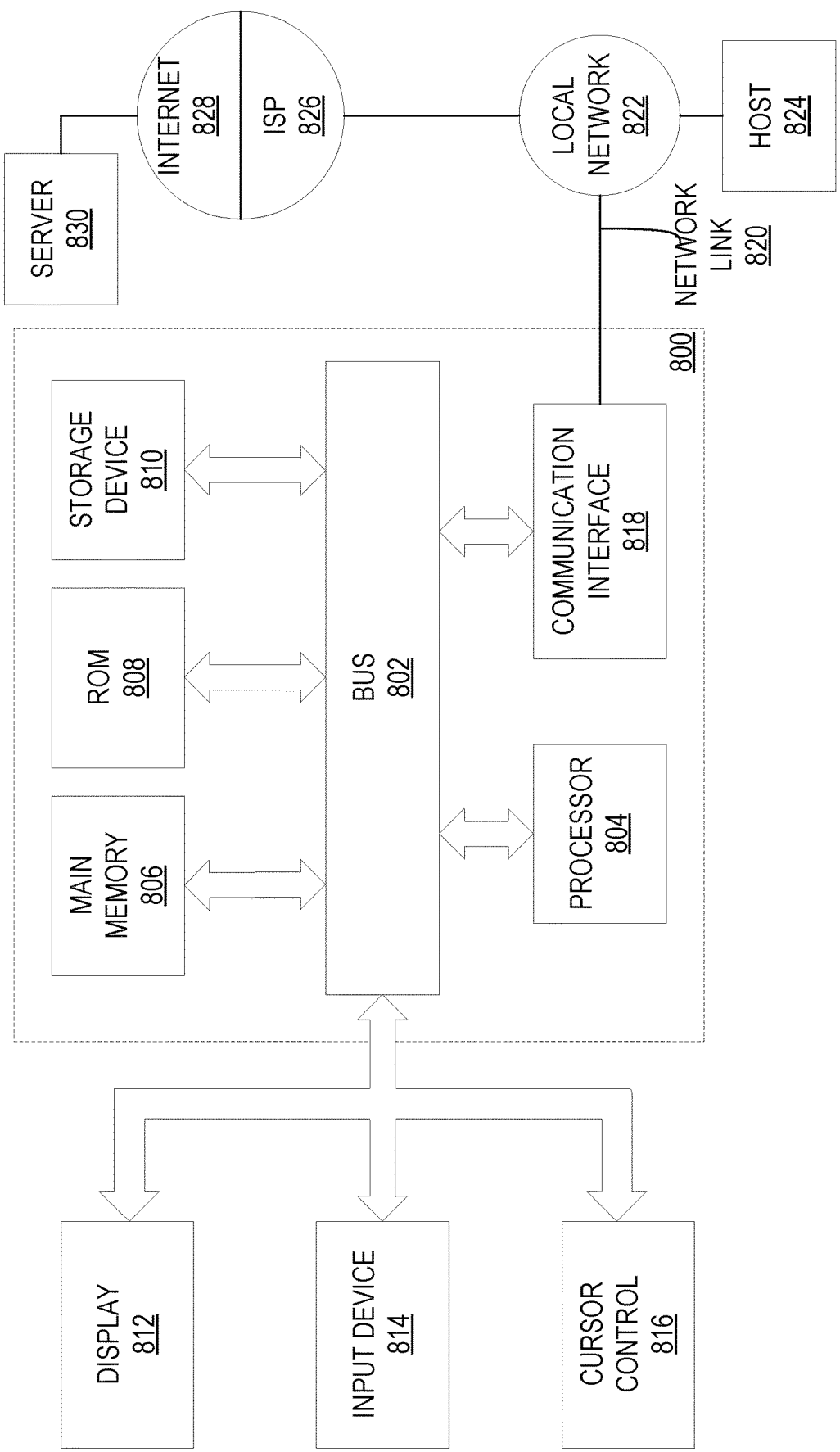

SECURE LOW-LATENCY TRAPDOOR PROXY

The present invention relates generally to data security and, in particular, to securing data accesses between client devices and servers external to corporate infrastructures.

BACKGROUND

Corporate information system security risks have dramatically increased due to the exponential growth of mobile users with computing devices that bypass conventional network security devices, such as corporate firewalls and secure web gateways. In prior approaches, companies issued or managed devices internally and were forced to route all network traffic through one or more proxy servers or appliances hosted by a third party. The proxy servers were typically geographically distributed at multiple locations. The hosted proxies decrypt SSL encrypted tunnels to inspect traffic for malware, threats, and data leakage, in lieu of the corporate firewall. After inspection, the hosted proxies forward the traffic on to the intended destinations.

Traditional network firewalls are located on the same ethernet LAN as the end computing device. Ethernet LANs have a latency of a few microseconds and have a high bandwidth capacity of many gigabytes (GB). The added delays are not perceptible to human users. In contrast, the link between a mobile computing device, e.g., a laptop computer, and the hosted proxy is on the WAN, can add a substantial latency of 10-100 ms. Furthermore, at peak loads, the hosted proxy slows down under such loads, thereby causing a network bottleneck.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 8 illustrates an example hardware platform on which a computer or a computing device as described herein may be implemented.

DESCRIPTION OF EXAMPLE EMBODIMENTS

Example embodiments, which relate to secure applications access and data security, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1. Device Proxy Operation
3.0. Implementation Mechanism—Hardware Overview
4.0. Extensions and Alternatives

1.0. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format and should be understood as merely a conceptual prelude to a more detailed description of example embodiments that follows below.

An embodiment addresses information security risks caused by the exponential growth of mobile users with computing devices that bypass conventional network security devices, such as corporate firewalls and secure web gateways. A proxy system is installed on a computing device that is in the network path between the device and the Internet. This approach overcomes the latency delay and performance bottleneck of previous solutions. The proxy system, residing on the computing device, decrypts and inspects all traffic going in and out of the computing device. This approach also addresses the technical challenge of storing decryption keys on the device without compromising security.

Various modifications to the preferred embodiments and the generic principles and features described herein will be readily apparent to those skilled in the art. Thus, the disclosure is not intended to be limited to the embodiments shown but is to be accorded the widest scope consistent with the principles and features described herein.

2.0. Functional Overview

Figure 1:
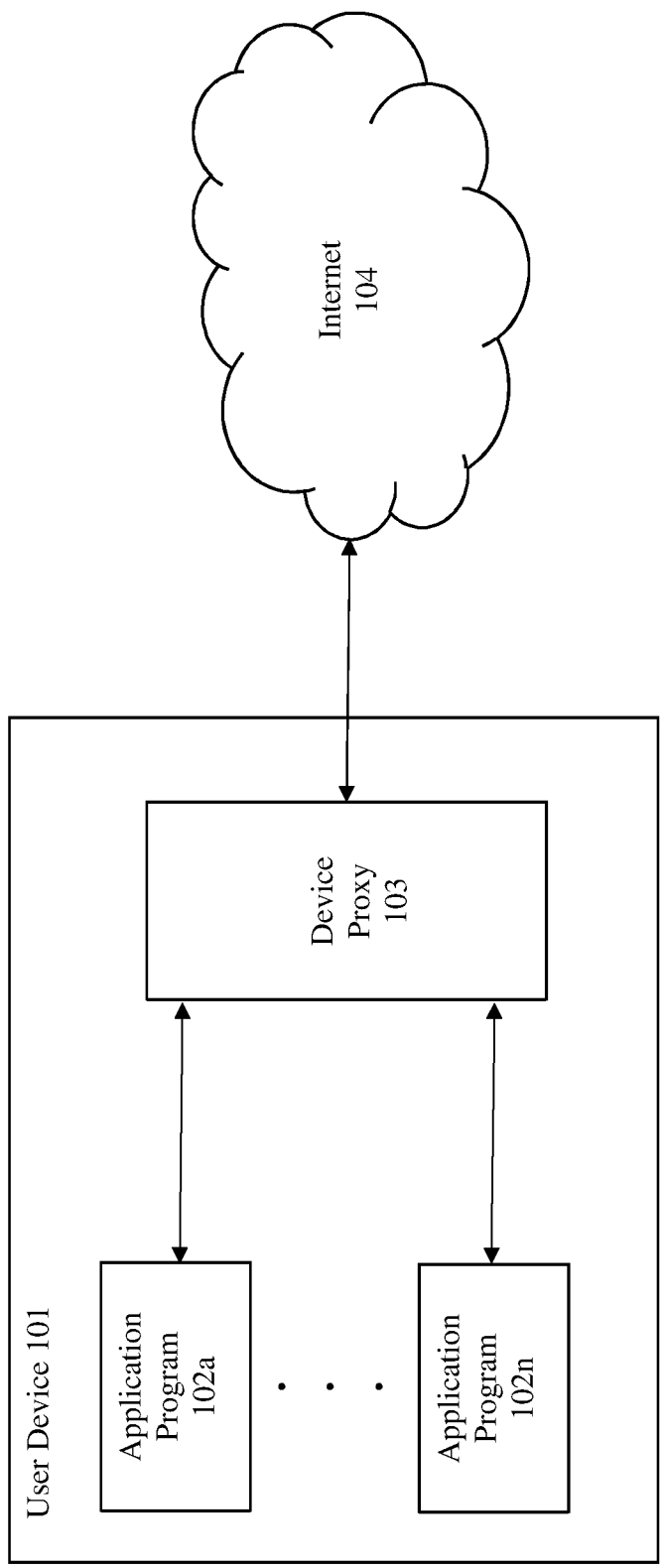
FIG. 1 illustrates a high-level block diagram of a trapdoor device proxy operating in a user device, according to an embodiment of the invention.

Referring to FIG. 1, in an embodiment, a device proxy 103 is installed on a user computing device (user device) 101 that is in the network path between one or more application programs 102*a*-102*n* executing on user device 101 and the Internet 104. The device proxy 103 performs operations such as, monitoring SSL traffic into the user device 101, verification of authorized servers, encrypting and decrypting incoming and outgoing data, encrypting and decrypting data to and from one or more application programs 102a-102n. Application programs can be programs such as Web browsers, accounting programs, databases, word processing programs, workflow management programs, specialized application programs, etc. The device proxy 103, regulates access to data, as well as securely manipulating the data so it can be securely stored on the user device 101. This approach overcomes the latency delay and performance bottleneck of previous solutions.

Figure 2:
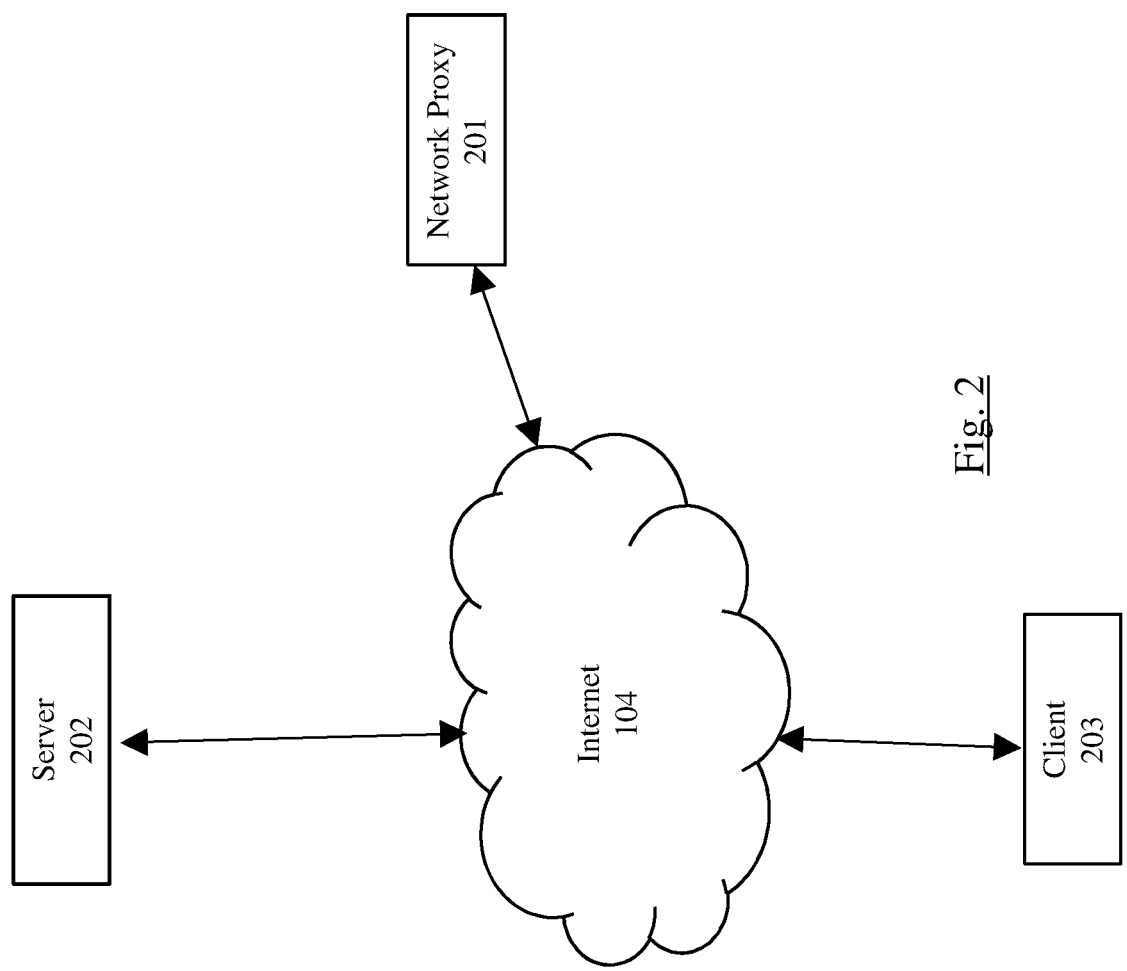
FIG. 2 illustrates a topology of a network proxy server, according to an embodiment of the invention.

Referring to FIG. 2, for example, in a network-based proxy approach, the network proxy 201 receives network traffic between one or more client application programs executing on a client 203 and the application server 202. The one or more client application programs are modified to direct all traffic to the proxy 201. All communications are then intermediated by the proxy 201. The proxy 201 can block or modify data contained in requests and responses appropriately to ensure the security of the data stored at and retrieved from the application server 202. The location of the network proxy 201 introduces a delay into the response time for communications between the application server 202 and the application programs executing on the client 203.

Figure 3:
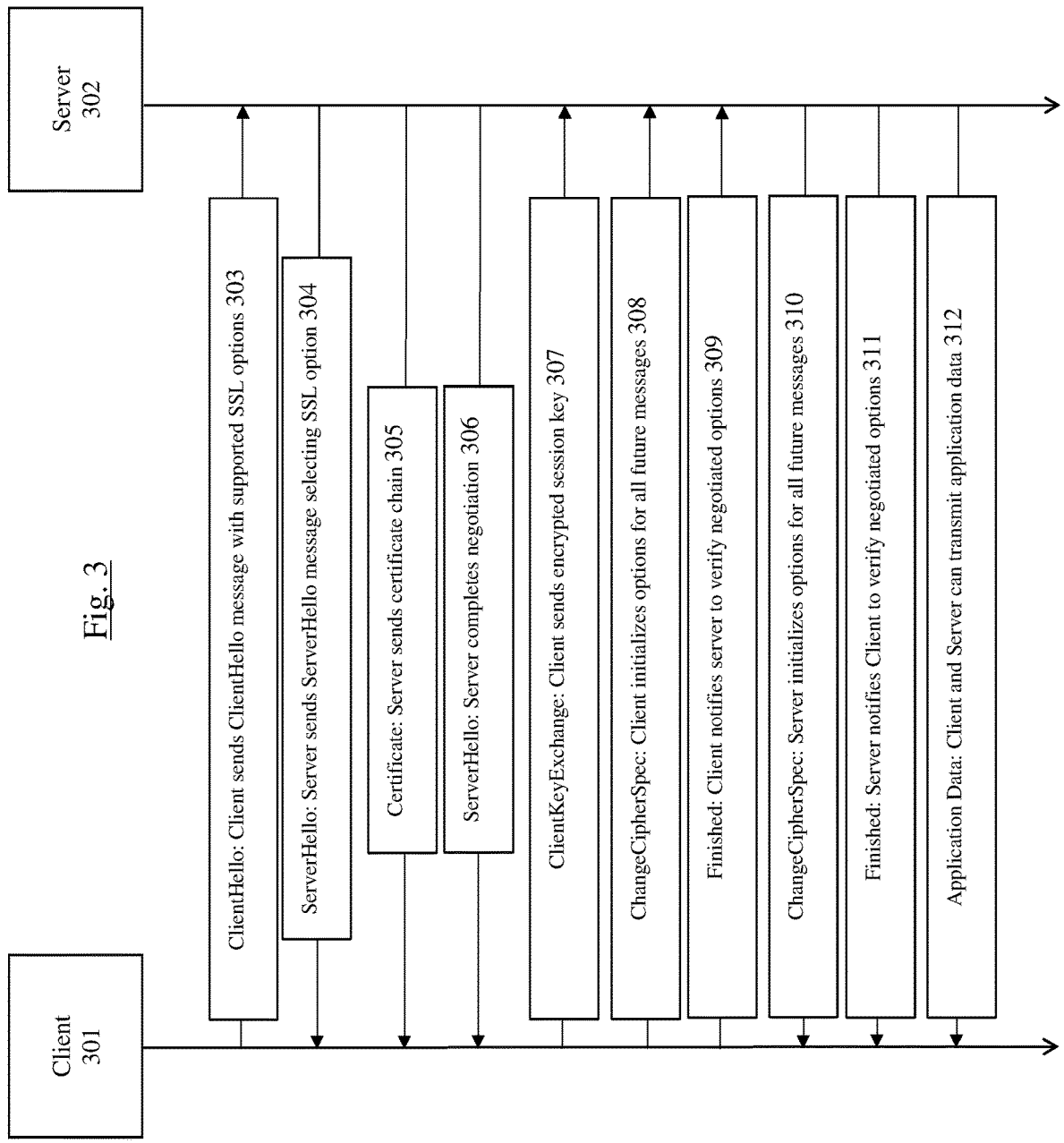
FIG. 3 illustrates an SSL key exchange data flow timing diagram, according to an embodiment of the invention.

Referring to FIG. 3 the SSL/TLS standard for exchanging a secret session key for encrypting data in an encrypted tunnel is illustrated. The protocol begins with a client 301 transmitting to the server 302, a client hello message with a list of encryption options it supports 303. The server 302 selects one of the supported options and responds to the client 301 with a server help message that includes the selected option 304. The server 302 also transmits to the client 301 its public key certified by a certificate authority 305 this includes a certificate that includes its certificate authority chain of trust. The server 302 then notifies the client 301 that the negotiation is complete 306. The client 301 verifies the certificate, then selects a cryptographically strong encryption key for the session, encrypts the session key with the server's public key, and transmits the encrypted session key 307 to the server 302. The server 302 decrypts the session key with its private key. The client 301 initializes options for future messages between the client and the server 308. The client 301 then notifies the server 302 that the server is to verify the negotiated options 309. The server 302 initializes options for future messages between the server and the client 310. The server 302 then notifies the client 301 to verify the negotiated options 311. Thereafter the client and server can exchange data encrypted with the session key 312.

Figure 4:
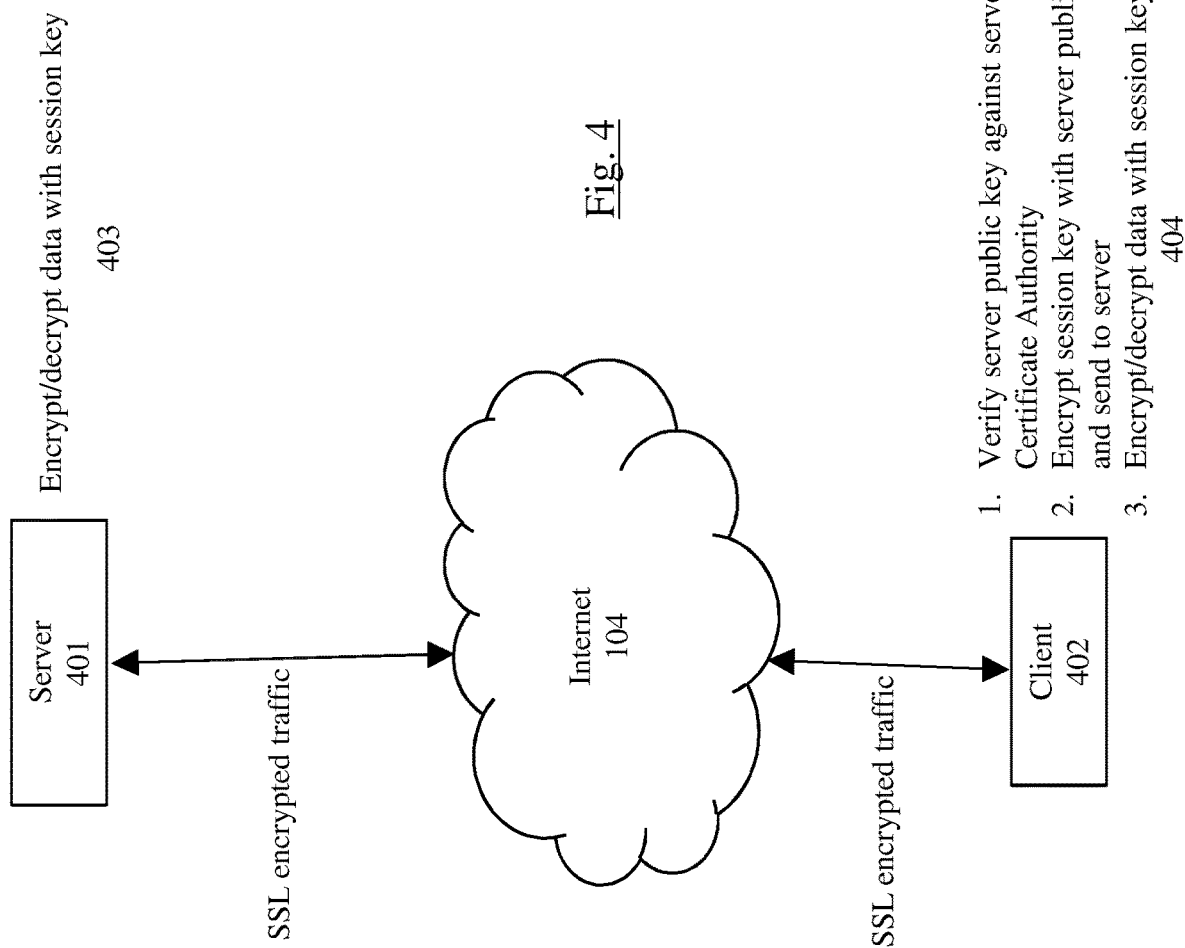
FIG. 4 illustrates a topology of an SSL key exchange traffic flow across the Internet, according to an embodiment of the invention.

Referring to FIG. 4, a summarized depiction of the key exchange and data transmission between a client 402 and the application server 401 is illustrated, where the basic SSL operations of the client 402 and application server 401 are depicted. SSL traffic occurs between the sever 401 and client 402. The application server 401 encrypts data sent to the client 402 and decrypts data received from the client 402 with a session key 402. The client 203 performs the following: verifies the server public key against a server Certificate Authority certificate; encrypts the session key with the server public key and sends the session key to the server; and encrypts/decrypts data with the session key.

Figure 5:
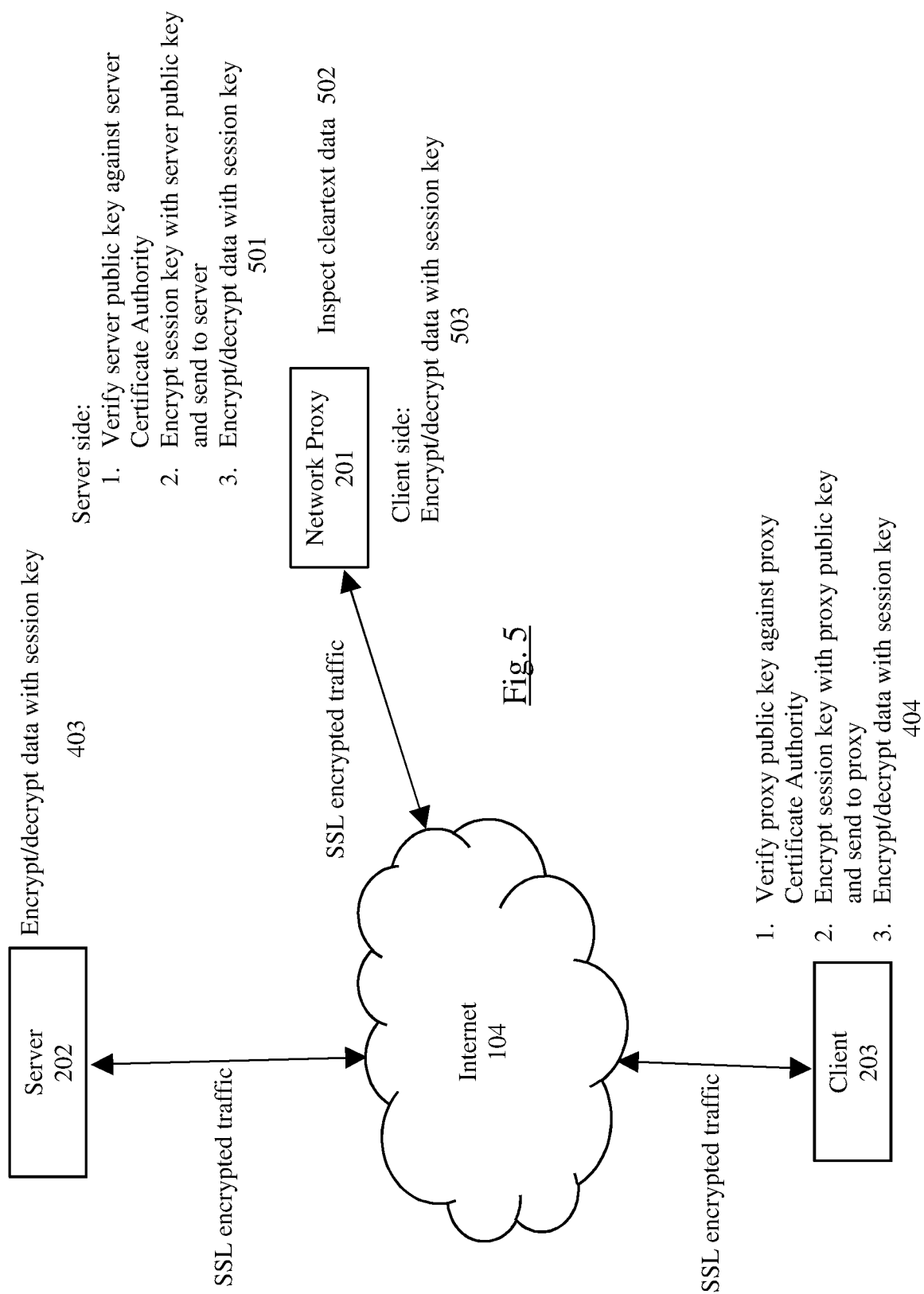
FIG. 5 illustrates a topology of a network proxy scenario, according to an embodiment of the invention.

Referring to FIG. 5, a scenario is illustrated where a network proxy 201 sits between the application server 202 and the client 203, decrypting and inspecting traffic. This is an extension of FIG. 4, except that the application server 202 views the network proxy 201 as the client 203 and the client 203 views the network proxy 201 as the application server 202. The network proxy's public key may be signed by a certificate authority that is specific to the institution accepting the user of the network proxy 201, and the client 203 must first accept that certificate authority in its chain of trust. The network proxy 201 performs several tasks. On the server side, the network proxy 201 performs the following: verifies the server public key against a server Certificate Authority certificate; encrypts the session key with the server public key and sends it to the server; and encrypts/decrypts data with the session key 501. The network proxy 201 inspects all cleartext data 502 that it passes to the client 203 and the application server 202. On the client side, the network proxy 201 encrypts/decrypts data with the session key 503. The client 203 performs the following: verifies the proxy public key against the proxy Certificate Authority; encrypts the session key with the proxy public key and sends it to the proxy; and encrypts/decrypts data with the session key.

2.1. Device Proxy Operation

When the proxy is resident on a server on the network, traffic must flow through an additional network hop to travel from the server to the client. This increases the latency between the server and the client resulting in a poor user experience.

In an embodiment, to eliminate the added latency, the proxy can be installed as a software agent on the user's computing device. However, it is possible that if the device is lost or stolen, the proxy could be installed at a network address and be used to intercept encrypted traffic flowing to other such devices at the same institution.

In an embodiment, the above-mentioned vulnerability when the proxy is resident on the user's computing device is addressed. Specifically, even if the user device is lost or stolen, the proxy on the device will not be trusted by any other device at the same institution.

Figure 6:
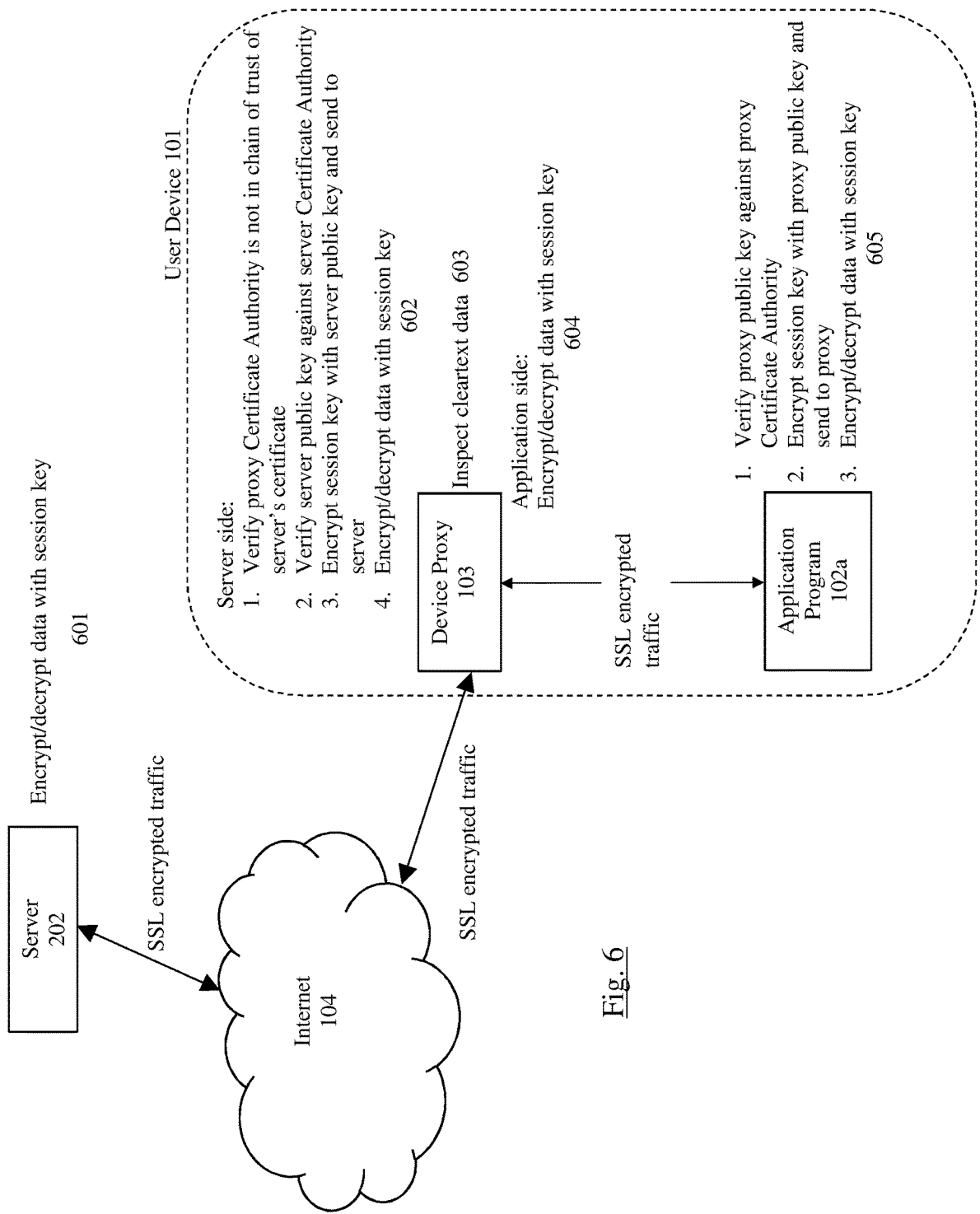
FIG. 6 illustrates a topology of a trapdoor device proxy operational environment in a network, according to an embodiment of the invention.

Referring to FIG. 6 the device proxy 103 never trusts its own certificate authority for upstream traffic, and therefore one device proxy can never intercept traffic flowing to a second device proxy. In other words, the flow of trust is unidirectional in the device proxy 103. During the SSL/TLS key exchange, the device proxy 103 checks whether its certificate authority is not in the chain of trust of the server's certificate. The device proxy 103 checks whether the server's certificate is not signed by the device proxy's certificate authority or any other certificate authority whose certificate is in turn signed by the device proxy's certificate authority. If the device proxy's certificate authority is not in the chain of trust of the server's certificate, then the device proxy 103 has confidence that it is not communicating with a spoofed or stolen device.

Thus, these proxies are generally referred to herein as "trapdoor" proxies. Proxy operations are moved into the user device 101 such that communications between the device proxy 103 and the application program 102a are the same SSL traffic similar to the communications between network proxy 201 and client 203 in the example shown in FIG. 5.

On the server side communication side, device proxy 103 performs the following: verifies that the proxy's certificate authority is not in the chain of trust of the server's certificate authority; verifies the server public key against the server's certificate and its chain of trust; encrypts the session key with the server public key and sends it to the server; and encrypts/decrypts data with the session key 602. During the SSL/TLS key exchange, the device proxy 103 performs the verification that its certificate authority is not in the chain of trust of the server's certificate. If the device proxy's certificate authority is in the chain of trust of the server's certificate, the device proxy 103 ignores the key exchange with the server 202. Otherwise, the device proxy 103 completes the key exchange of: verifying the server public key against the server certificate authority certificate and encrypting the session key with the server public key and sending it to the server 202. The device proxy 103 inspects all cleartext data 603 that it passes to the application program 102a and the application server 202. On the application program side, the device proxy 103 encrypts/decrypts data with the session key 604. SSL encrypted traffic flows between the device proxy 103 and the application program 102a.

The application program 102a performs the following: verifies the proxy public key against the proxy certificate authority; encrypts the session key with the proxy public key and sends it to the device proxy; and encrypts/decrypts data with the session key.

In an embodiment, to enhance security, each device proxy has a unique private key and public key pair, along with the associated public key certificate. If the user device carrying a device proxy is compromised, the corresponding public key certificate can be revoked.

In an embodiment, as an added security measure, each institution deploying device proxies can be issued their own proxy Certificate Authority so that user devices belonging to one institution will never trust device proxies belonging to another institution.

In an embodiment, as an alternate security measure, each device proxy can utilize one or more Certificate Authorities unique to the device proxy.

In an embodiment, the device proxy 103 performs the verification that its certificate authority is not in the chain of trust of the server's certificate: periodically, after a random or specific number of exchanges occur between the application server 202 and client 203, etc.

Figure 7:
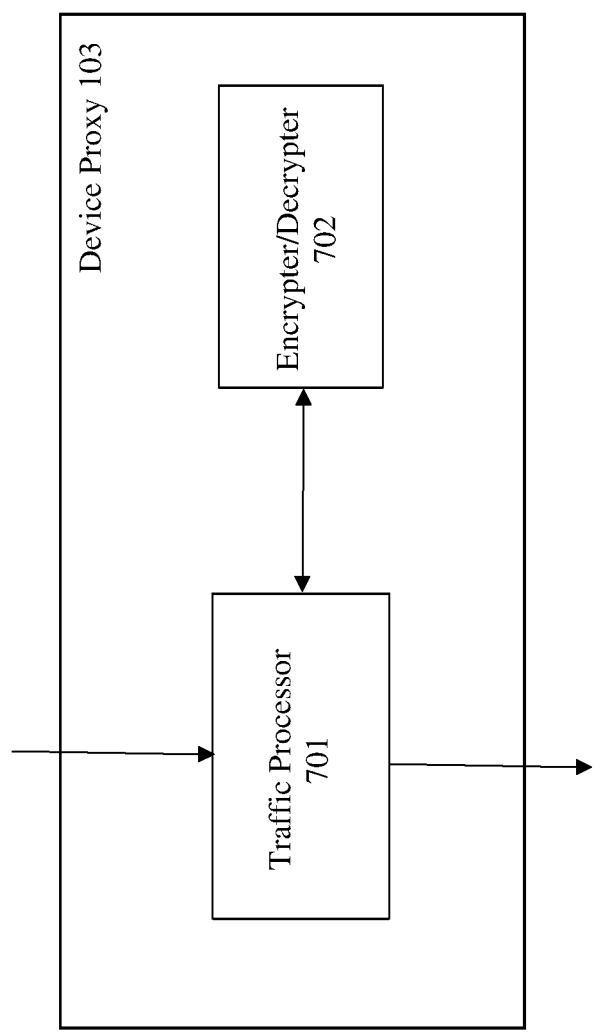
FIG. 7 illustrates a high-level block diagram of a trapdoor device proxy, according to an embodiment of the invention.

Referring to FIG. 7, a high-level block diagram of device proxy 103 is shown. During the SSL/TLS key exchange, the traffic processor 701 performs the verification that the device proxy's certificate authority is not in the chain of trust of the server's certificate. If the device proxy's certificate authority is in the chain of trust of the server's certificate, the traffic processor 701 ignores the key exchange with the server. Otherwise, the traffic processor 701 completes the key exchange of: verifying the server public key against the server certificate authority certificate, and encrypting the session key with the server public key and sending it to the server.

Traffic processor 701 processes traffic received from the application server 202 and traffic received from application programs such as application program 102a. The traffic processor 701 monitors incoming traffic going to the application program 102a. The traffic processor 201 inspects cleartext data in the traffic. The cleartext data may indicate malware, pornography, other risky content, etc. In an embodiment, the traffic processor 701 may block requests from the application program 102a to pornography sites or other risky sites. The traffic processor 701 may also block malware or other restricted data (e.g., types of data restricted by an administrator or distributed list, etc.) contained in traffic received from the application server 202. In an embodiment, the traffic processor 701 may maintain a database of URLs categorized by risk and content type. Administrators can configure the nature of the content and determine the risk that is acceptable for the organization.

Likewise, the traffic processor 701 may include a malware engine (not shown) for detecting malware downloaded from the application server 202.

The traffic processor 701 passes data to encrypter/decrypter 702 to be encrypted or decrypted with the session key. SSL encrypted traffic is sent between the traffic processor 701 and the application program 102a.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is device-specific to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using device-specific hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

4.0. Equivalents, Extentions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method, comprising:
receiving, by a device proxy executing on a user device, data from an application server via a network;
determining, by the device proxy, whether a certificate authority of the device proxy is in a certificate authority chain of trust in a certificate of the application server;
based on a determination that the certificate authority of the device proxy is in the certificate authority chain of trust in the certificate of the application server, refusing the data from the application server;

based on a determination that the device proxy's certificate authority is not in the certificate authority chain of trust in the application server's certificate:
   decrypting the data with a session key;
   inspecting cleartext data in the decrypted data;
   encrypting the decrypted data with the session key;
   sending the encrypted data to an application program executing on the user device.

2. The method as recited in claim 1, wherein the inspecting the cleartext data in the decrypted data further comprises:
   detecting whether malware is present in the cleartext data;
   based on detecting that malware is present in the cleartext data, blocking the data from reaching the application program.

3. The method as recited in claim 1, wherein the inspecting cleartext data in the decrypted data further comprises:
   detecting whether restricted data is present in the cleartext data;
   based on detecting that restricted data is present in the cleartext data, blocking the data from reaching the application program.

4. The method as recited in claim 1, wherein the based on a determination that the device proxy's certificate authority is not in the certificate authority chain of trust in the application server's certificate further comprises:
   receiving, by the device proxy, second data from the application program;
   decrypting, by the device proxy, the second data with the session key;
   inspecting, by the device proxy, second cleartext data in the decrypted second data;
   encrypting, by the device proxy, the decrypted second data with the session key;
   sending, by the device proxy, the encrypted second data to the application server.

5. The method as recited in claim 1, wherein each device proxy among a plurality of device proxies has a unique private key and public key pair and an associated public key certificate.

6. The method as recited in claim 1, wherein an institution deploying the device proxy is issued its own proxy certificate authority so the device proxy does not trust other device proxies belonging to another institution.

7. The method as recited in claim 1, wherein the device proxy uses one or more certificate authorities unique to the device proxy.

8. One or more non-transitory computer-readable storage media, storing one or more sequences of instructions, which when executed by one or more processors cause performance of:
   receiving, by a device proxy executing on a user device, data from an application server via a network;
   determining, by the device proxy, whether a certificate authority of the device proxy is in a certificate authority chain of trust in a certificate of the application server;
   based on a determination that the certificate authority of the device proxy is in the certificate authority chain of trust in the certificate of the application server, refusing the data from the application server;
   based on a determination that the device proxy's certificate authority is not in the certificate authority chain of trust in the application server's certificate:
      decrypting the data with a session key;
      inspecting cleartext data in the decrypted data;
      encrypting the decrypted data with the session key;
      sending the encrypted data to an application program executing on the user device.

9. The one or more non-transitory computer-readable storage media as recited in claim 8, wherein the inspecting the cleartext data in the decrypted data further comprises:
   detecting whether malware is present in the cleartext data;
   based on detecting that malware is present in the cleartext data, blocking the data from reaching the application program.

10. The one or more non-transitory computer-readable storage media as recited in claim 8, wherein the inspecting cleartext data in the decrypted data further comprises:
    detecting whether restricted data is present in the cleartext data;
    based on detecting that restricted data is present in the cleartext data, blocking the data from reaching the application program.

11. The one or more non-transitory computer-readable storage media as recited in claim 8, wherein the based on a determination that the device proxy's certificate authority is not in the certificate authority chain of trust in the application server's certificate further comprises:
    receiving, by the device proxy, second data from the application program;
    decrypting, by the device proxy, the second data with the session key;
    inspecting, by the device proxy, second cleartext data in the decrypted second data;
    encrypting, by the device proxy, the decrypted second data with the session key;
    sending, by the device proxy, the encrypted second data to the application server.

12. The one or more non-transitory computer-readable storage media as recited in claim 8, wherein each device proxy among a plurality of device proxies has a unique private key and public key pair and an associated public key certificate.

13. The one or more non-transitory computer-readable storage media as recited in claim 8, wherein an institution deploying the device proxy is issued its own proxy certificate authority so the device proxy does not trust other device proxies belonging to another institution.

14. The one or more non-transitory computer-readable storage media as recited in claim 8, wherein the device proxy uses one or more certificate authorities unique to the device proxy.

15. An apparatus, comprising:
   a device proxy executing on a user device, implemented at least partially in hardware, configured to receive data from an application server via a network;
   wherein the device proxy is further configured to determine whether a certificate authority of the device proxy is in a certificate authority chain of trust in a certificate of the application server;
   wherein the device proxy is further configured to, based on a determination that the certificate authority of the device proxy is in the certificate authority chain of trust in the certificate of the application server, refuse the data from the application server;
   wherein the device proxy is further configured to, based on a determination that the device proxy's certificate authority is not in the certificate authority chain of trust in the application server's certificate:
      decrypt the data with a session key;
      inspect cleartext data in the decrypted data;
      encrypt the decrypted data with the session key;

send the encrypted data to an application program executing on the user device.

16. The apparatus as recited in claim 15, wherein the inspect the cleartext data in the decrypted data further comprises:

detect whether malware is present in the cleartext data;

based on detecting that malware is present in the cleartext data, block the data from reaching the application program.

17. The apparatus as recited in claim 15, wherein the inspect cleartext data in the decrypted data further comprises:

detect whether restricted data is present in the cleartext data;

based on detecting that restricted data is present in the cleartext data, block the data from reaching the application program.

18. The apparatus as recited in claim 15, wherein the device proxy based on a determination that the device proxy's certificate authority is not in the certificate authority chain of trust in the application server's certificate is further configured to:

receive second data from the application program;

decrypt the second data with the session key;

inspect second cleartext data in the decrypted second data;

encrypt the decrypted second data with the session key;

send the encrypted second data to the application server.

19. The apparatus as recited in claim 15, wherein an institution deploying the device proxy is issued its own proxy certificate authority so the device proxy does not trust other device proxies belonging to another institution.

20. The apparatus as recited in claim 15, wherein the device proxy uses one or more certificate authorities unique to the device proxy.

* * * * *